United States Patent

Tsukamoto et al.

Patent Number: 5,994,035
Date of Patent: Nov. 30, 1999

[54] METHOD OF PRODUCING MAGNETIC HEAD SLIDER OF THE FLYING TYPE HAVING A PROTECTIVE COATING

[75] Inventors: Yuji Tsukamoto; Ken Ajiki, both of Tokyo, Japan

[73] Assignee: NEC Corporation, Japan

[21] Appl. No.: 09/030,336

[22] Filed: Feb. 25, 1998

Related U.S. Application Data

[62] Division of application No. 08/838,127, Apr. 15, 1997.

[30] Foreign Application Priority Data

Apr. 19, 1996 [JP] Japan ..................................... 8-122759
Jul. 19, 1996 [JP] Japan ..................................... 8-221921

[51] Int. Cl.$^6$ ....................................................... G03F 7/00
[52] U.S. Cl. ......................... 430/320; 430/323; 430/324
[58] Field of Search .................................. 430/320, 324, 430/323

[56] References Cited

U.S. PATENT DOCUMENTS 5,665,251  9/1997  Robertson et al. ....................... 216/22
5,777,824  7/1998  Gray ........................................ 360/103
5,853,959  12/1998  Brand et al. ............................. 430/320

*Primary Examiner*—Janet Baxter
*Assistant Examiner*—Yvette M. Clarke
*Attorney, Agent, or Firm*—Hayes, Soloway, Hennessey, Grossman & Hage PC

[57] ABSTRACT

A magnetic head slider has a protective film which forms, at a portion of an air bearing surface nearer to the air incoming side from the center, a hill-shaped crown of a desired height sufficient in terms of the mechanical durability of the protective film by a variation of the film thickness of the protective film and which is flat with a film thickness of 10 nm or less on the air outgoing side at which a magnetic head element is provided. This protective film may be a diamond-like carbon film (DLC) or a single layer structure of polycrystalline Si or else a layered structure of a combination of them.

10 Claims, 6 Drawing Sheets

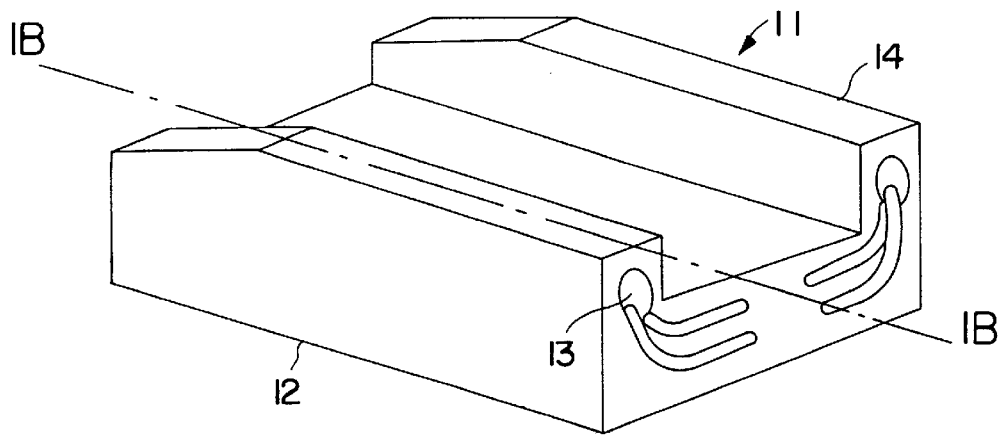
FIG. IA
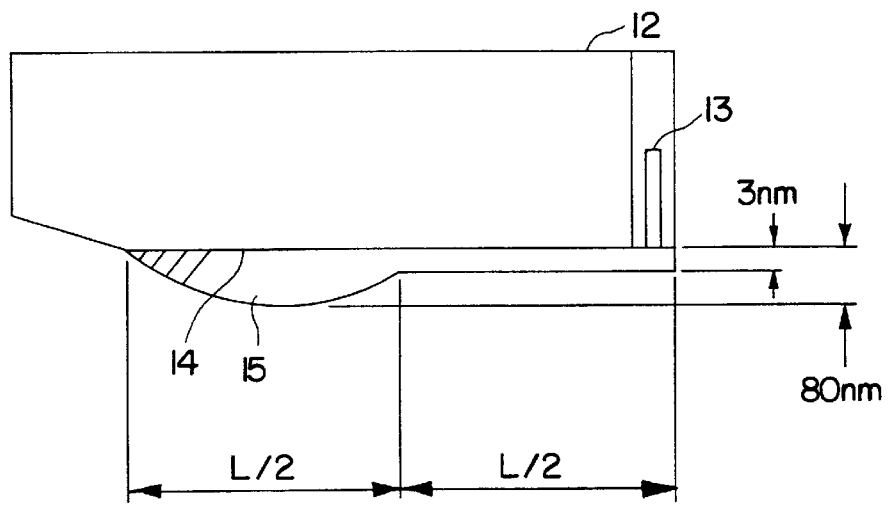
FIG. IB
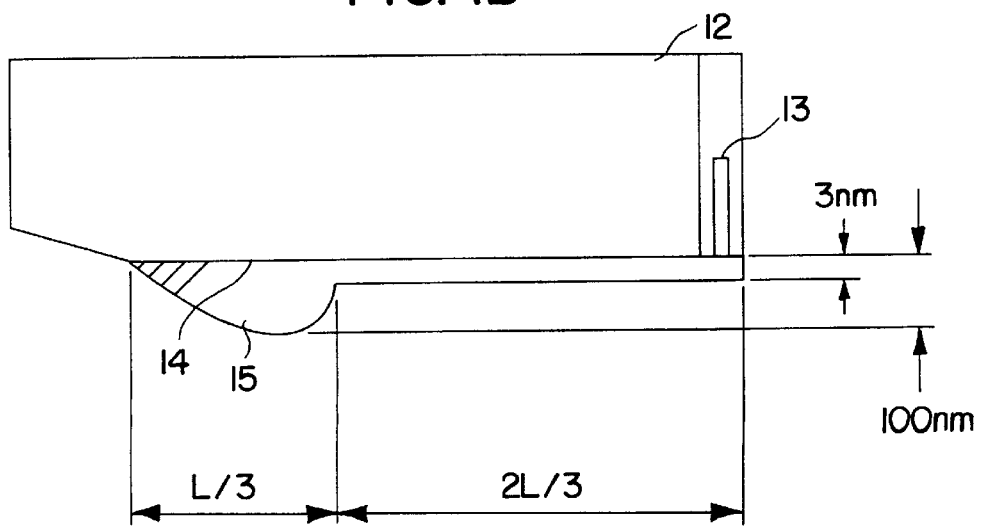
FIG. 2

METHOD OF PRODUCING MAGNETIC HEAD SLIDER OF THE FLYING TYPE HAVING A PROTECTIVE COATING

This is a divisional of application Ser. No. 08/838,127 filed on Apr. 15, 1997, pending.

BACKGROUND OF THE INVENTION

1. Field of the Invention

This invention relates to a magnetic head for use with a magnetic disk storage apparatus, and more particularly to a magnetic head slider for a magnetic head and a production method therefor.

2. Description of the Related Art

The recording density of a magnetic disk storage apparatus has exhibited a significant augmentation in recent years. Particularly, the technique of reducing magnetic spacing between a magnetic head element and a magnetic recording medium, which augments the track recording density, has exhibited a progress, and a magnetic disk apparatus which incorporates a magnetic head of a very low flying type whose flying height is 30 nm or less has been put into practical use.

However, while such reduction in flying of a magnetic head brings an increase of the track recording density, an apparatus of a so-called contact start stop system hereinafter referred to as CSS system which is employed widely in hard disk apparatus and wherein starting and stopping are performed while the magnetic head remains in contact with the magnetic disk has a problem in that, if a magnetic disk surface is formed very smooth as a mirror surface and the magnetic head is left in close contact with each other for a long time, then the magnetic head tends to stick to the magnetic disk surface. The head sticking degrades the mechanical durability and the reliability of the magnetic disk apparatus.

One solution for this problem is to provide a protective film on an air bearing surface of a magnetic head slider. For example, it is disclosed in Japanese Patent Laid-open No. 63-2-8912, November 1988 to fluoridate an air bearing surface of a magnetic head slider made of glassy carbon to produce a graphite fluoride layer so that the wear of the magnetic recording medium is suppressed and a starting failure or a stick slip phenomenon which arises from the head sticking to the medium is prevented by a good solid lubrication characteristic of the graphite fluoride layer.

Further, in expectation of a similar effect, a magnetic head has been put into practical use wherein a carbon film is provided on an air bearing surface of a slider by a chemical vapor deposition (CVD) method or a sputtering method.

Meanwhile, in order to prevent sticking between the surface of a magnetic disk medium and a slider when a magnetic disk apparatus is inoperative, an air bearing surface of the magnetic head slider is formed convex called crown. The convex forming work is usually performed by mechanical polishing such as lapping as disclosed, for example, in Japanese Patent Laid-Open No. 4-358378, December, 1992.

Also the following methods have been proposed for the crown forming other than mechanical polishing.

1) A method wherein a groove is provided at a portion on the opposite side of an air bearing surface by mechanical working and a crown shape is formed making use of a difference in working distortion arising from the position, the shape, the dimension or some other factor of the groove as disclosed, for example, in Japanese Patent Laid-Open No. 1-267822, October, 1989 or another method wherein a crown is formed making use of a difference in coefficient of thermal expansion between an organic resin filled in a groove and a slider material as disclosed in Japanese Patent Laid-Open No. 62-6475, January, 1987.

2) A method wherein a piezoelectric element is securely mounted on a rear surface to an air bearing surface of a slider and a voltage is applied to the piezoelectric element to deform the slider to form a crown as disclosed in Japanese Patent Laid-Open No. 1-166382, June, 1989 and so forth.

3) A method wherein a protective thin film is provided on an air bearing surface of a slider and the film thickness of the slider protective film is varied continuously such that a central portion of a slide rail in a longitudinal direction may project by a predetermined extent to shape the air bearing surface into a crown shape.

However, the magnetic head slider protective film has the following problems.

In order to reduce the magnetic spacing for increasing the magnetic recording density, the slider protective film is preferably formed as thin as possible, but in order to assure the mechanical durability, it is effective to form the protective film as thick as possible. In this manner, in the slider protective film, the two factors for increasing the recording density and the assurance of the durability have a trade-off relationship to each other. Accordingly, in order to solve this relationship, the protective film should be formed with such thickness that it has a comparatively great thickness in the region of the air bearing surface which contacts with and slides on the magnetic disk surface with a high probability and creates a factor which defines the mechanical durability, but has a comparatively small thickness in the region of the magnetic head element which creates a factor which defines the recording density.

As a solution for this problem, a method is disclosed in Japanese Patent Laid-Open No. 7-65527 mentioned hereinabove wherein a protective film is provided on an air bearing surface of a slider and, upon formation of the protective film, the film thickness is controlled to vary continuously by opening/closing of a shutter to form a crown shape on the air bearing surface.

However, the last-described method still has some problems as follows.

Generally, since a carbon type thin film used for a slider protective film has a coefficient of static friction with the surface of a magnetic disk, the probability that the slider may stick to the disk surface to put the magnetic disk apparatus into a starting disabled condition is high. Further, a protective film of the carbon type provided on a magnetic head slider requires a crown amount larger than that of another magnetic head slider without a protective film. Further, where the film thickness of a protective film is controlled by opening/closing of a shutter upon film formation, there is a problem in controllability in film thickness or mass productivity.

Further, where a crown shape is formed on the full area of an air bearing surface, the crown shape is restricted in order to minimize the flying height of a magnetic head element. For example, the crown amount is limited such that, with a slider of 50% or called "nano" (2 mm long×1.6 mm wide× 0.5 mm high), a central portion of the air bearing surface remains within the range of 30 to 50 nm from the opposite ends of the air bearing surface, and with another slider of 30% or called "pico" (1.2 mm long×1 mm wide×0.3 mm high), a central portion of the air bearing surface remains within the range of 10 to 30 nm from the opposite ends of the air bearing surface. Besides, since not only this crown amount is insufficient for reduction of sticking but also the film thickness of the protective film is limited to this thickness, it is difficult to improve the durability.

Further, the problem when producing a crown by mechanical polishing or grooving resides in the shape itself and the working accuracy of the crown. In particular, since the working shape is limited, forming a crown of a complicated shape, wherein a convex shape is formed partially in an air bearing surface while the other part is formed flat, is impossible as far as it relies upon mechanical polishing or grooving.

Furthermore, if the desired crown height is set, for example, to 30 nm, then the standard deviation of the crown height by conventional mechanical polishing is 7 to 8 nm. On the other hand, a remarkable increase in recording density of a magnetic disk apparatus in recent years strongly requires smoothing of the surface of a magnetic disk and reduction of the flying height of a magnetic head slider. However, as the smoothness of the magnetic disk surfaces increases, the magnetic head slider increases its sticking to the disk surface. In other words, the coefficient of static friction between the magnetic head slider and the magnetic disk surface tends to increase. Therefore, for the crown amount which is an important factor which dominates sticking, a working accuracy of a higher level than ever, that is, the standard deviation of less than 2 nm for the average crown height of 30 nm, is required. Accordingly, in the present situation, this working accuracy cannot be satisfied with the crown working method which is based on mechanical polishing or grooving.

Meanwhile, the method of applying a voltage to a piezoelectric element securely mounted on a rear surface of a slider to form a crown is disadvantageous in terms of the production cost or the productivity since fixed mounting of the piezoelectric element and a voltage driving and controlling circuit are required separately.

SUMMARY OF THE INVENTION

It is an object of the present invention to provide a magnetic head slider and a production method therefore wherein the structure of a crown formed from a protective film on an air bearing surface is improved to effectively achieve reduction in coefficient of friction and sticking, improvement in mechanical durability and high density recording.

In order to attain the object described above, according to the present invention, a magnetic head slider of the flying type wherein a magnetic head element and a protective film are provided on an air bearing surface is constructed such that the protective film has a convex shape on the air incoming side of the air bearing surface by a variation of the film thickness thereof and has a substantially uniform film thickness of a predetermined value, preferably 10 nm or less, on the air outgoing side where the magnetic head element is provided.

A first production method for a magnetic head slider of the present invention comprises the steps of forming a protective film with approximately 50 to 200 nm on an air bearing surface of a magnetic head slider, coating an entire surface of the protective film formed by the preceding step with a photoresist film, removing the photoresist film on an air outgoing side by exposure and development processing, performing etching processing for the protective film in a region from which the photoresist film has been removed in the preceding step to reduce the film thickness to approximately 10 nm or less, removing the photoresist film remaining after the etching processing, and performing lapping processing of the entire surface of the protective film.

A second production method for a magnetic head slider of the present invention comprises the steps of forming a protective film of approximately 10 nm or less on an air bearing surface of a magnetic head slider, coating an entire surface of the protective film formed by the preceding step with a photoresist film, removing the photoresist film on an air outgoing side by exposure and development processing, forming a protective film in a region from which the photoresist film has been removed in the preceding step until the film thickness of the protective film becomes substantially equal to 50 to 200 nm, removing the photoresist film remaining after the re-formation processing of the protective film, and performing lapping processing for the entire surface of the protective film.

Accordingly, according to the present invention, the problem of the trade-off of the conventional methods against increase of the recording density and increase of the mechanical durability can be solved by forming the protective film such that it has a large thickness in a region of a portion thereof which defines the mechanical durability of the magnetic head slider, but has a small thickness in another region at a rear portion thereof in which the head element is provided and which defines the magnetic spacing.

Particularly by having a protective film on the air bearing surface of the magnetic head slider, where on the air incoming side has such a convex shape as seen in FIG. 1(B) while the protective film on the air outgoing side, where the magnetic head element is provided, is formed with a small fixed film thickness preferably of 10 nm or less, such operations and effects as described below can be obtained which cannot be obtained by the conventional methods.

1) Since the portion where the magnetic head element always exhibits a minimum flying height, the projecting amount d of the convex is not restricted, and the profile of it can be selected arbitrarily. For example, it is possible to apply a crown shape of the projecting amount d=100 nm or more, and simultaneously by reducing the contact area between the disk and the slider air bearing surface, improvement in the coefficient of friction between the disk and the slider and reduction in sticking can be achieved.

2) Since the thickness of the slider protective film in the air bearing surface region can be increased in accordance with a crown amount, the mechanical durability is increased. Further, by setting the thickness of the protective film in the region in which the magnetic head element is provided to 10 nm or less, the magnetic spacing can be reduced. Consequently, a magnetic head slider suitable for high density recording can be provided.

The above and other objects, features, and advantages of the present invention will become apparent from the following description referring to the accompanying drawings which illustrate an example of a preferred embodiment of the present invention.

BRIEF DESCRIPTION OF THE DRAWINGS

FIGS. 1(A) and 1(B) show an embodiment of a magnetic head slider according to the present invention, and FIG. 1(A) is a perspective view and FIG. 1(B) is a sectional view of an air bearing surface taken along line 1(B)—(1B) of FIG. 1(A);

FIG. 2 is a sectional view of a magnetic head slider of another embodiment of the present invention taken along an air bearing surface;

DESCRIPTION OF THE EMBODIMENTS

Figure 3A:
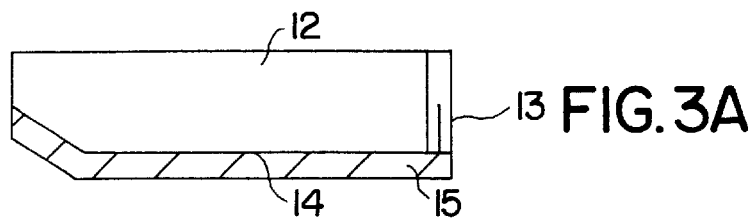
FIG. 3 shows schematic sectional views of an embodiment of a magnetic head slider arranged in order of steps illustrating a first production method of the present invention.
Figure 3B:
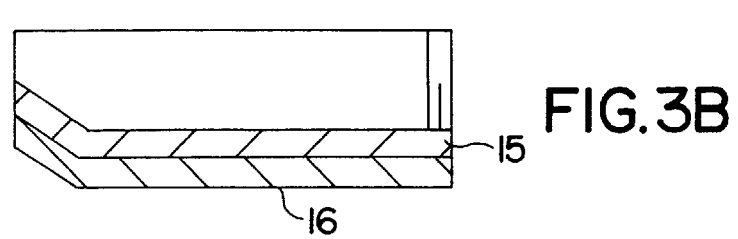
Figure 3C:
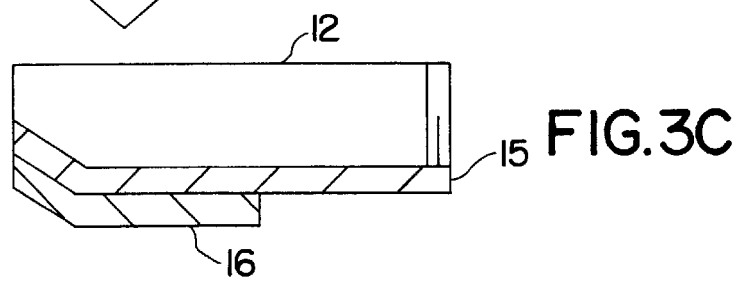
Figure 3D:
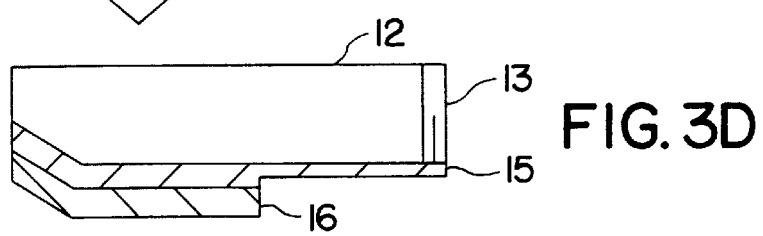
Figure 3E:
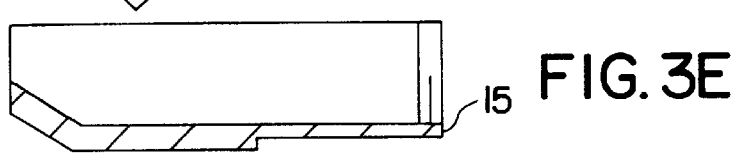
Figure 3F:
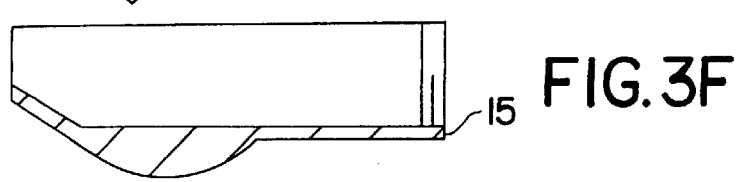
Figure 4A:
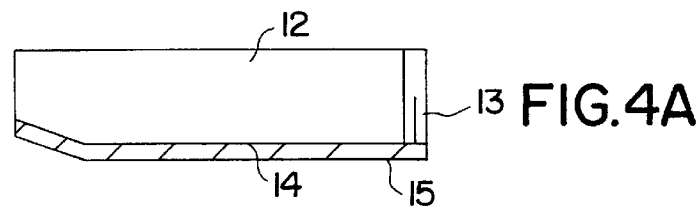
FIG. 4 shows schematic sectional views of an embodiment of a magnetic head slider arranged in order of steps illustrating a second production method of the present invention.
Figure 4B:
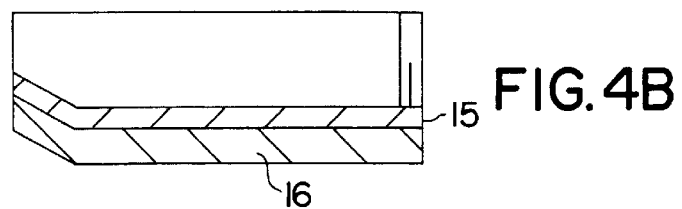
Figure 4C:
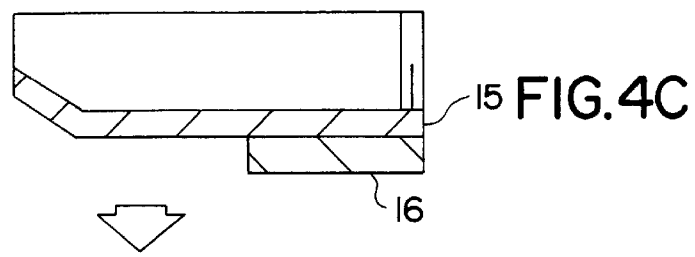
Figure 4D:
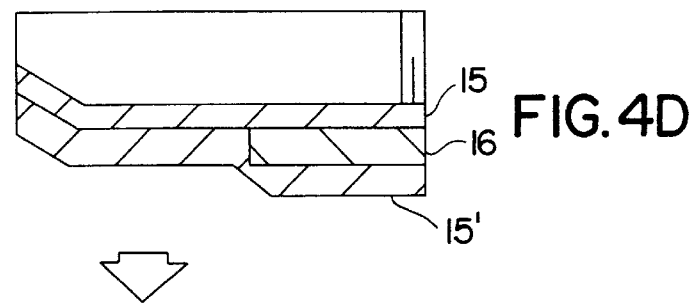
Figure 4E:
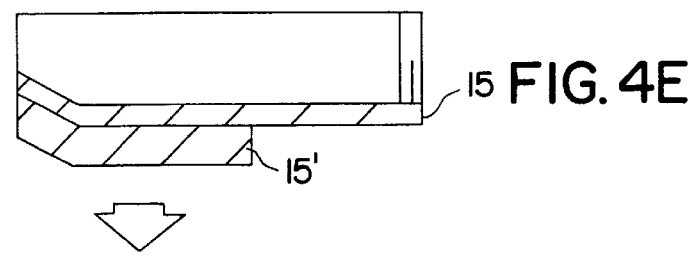
Figure 4F:
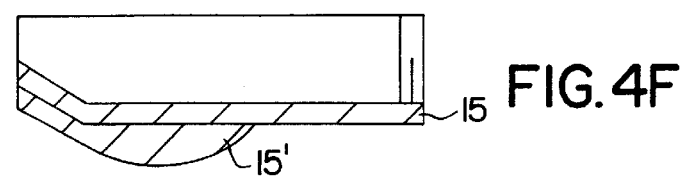

Referring to FIG. 1(A), a magnetic head slider 11 of a first embodiment according to the present invention is an example wherein the present invention is applied to a magnetic head of a flying slider generally called two rail tapered flat type. The magnetic head 11 includes a slider 12 having an air bearing surface 14 which runs in an opposing relationship to the surface of a magnetic medium, and a magnetic transducer 13 for effecting recording, reproduction and erasure operations.

The slider 12 is made of an $Al_2O_3$ TiC ceramic material and has outer profile dimensions of 2 mm long, 1.6 mm wide and 0.5 mm high. The air bearing surface 14 has a rail width of 200 $\mu$m and is finished flat with a tolerance of ±2 nm by mechanical polishing. Meanwhile, a protective film 15 provided on the air bearing surface 14 is a film of diamond-like carbon (DLC). As shown in FIG. 1(B), the protective film 15 is coated such that a half surface thereof on the air incoming side has a convex shape of a crown height of 80 nm while the other half thereof on the air outgoing side has a fixed film thickness of 3 nm. The protective film 15 may have a structure of a single layer film or a layered film.

The flying height of the portion where the magnetic transducer 13 is provided, that is, the minimum flying height, is approximately 35 nm.

Next, an example of a production method of the present invention will be described with reference to FIG. 3.

A slider 12 is made of an $Al_2O_3$ TiC ceramic material, and an air bearing surface 14 is finished flat with a tolerance of +/−2 nm by mechanical polishing. A protective film 15 of a single layer or layered structure is provided on the air bearing surface 14.

First, a bar member of the size of 25 mm×2 mm×0.5 mm which corresponds to the size of sliders 12 is secured to a protective film forming jig. A shutter is provided on the protective film forming jig, and the film thickness of the protective film is varied by adjusting or controlling the opening or closing speed of the shutter. (A) to (F) of FIG. 3 show one representative slider of the bar member.

(A) A diamond-like carbon protective (DLC) film 15 is formed as a protective film with the film thickness of 100 nm on the slider 12 by a radio frequency-chemical vapor deposition (RF-CVD) method. The conditions of the RF-CVD method are such that the RF output is 500 W, the gas pressure upon formation of the DLC film is 100 mTorr, and the types and the pressure ratio of gases are $CH_4/(CH_4+H_2)=0.3$.

(B) Then, a photoresist film 16 in the form of a sheet having a film thickness of 30 $\mu$m is coated on the protective film 15 using a roll coater.

(C) Thereafter, mask exposure and development are performed to remove the photoresist film 16 in a rear half region of a slider air bearing surface.

(D) Then, the protective film 15 in the other rear half region of the slider is removed to the film thickness of 5 nm by an ion etching method. The etching rate in this etching is 5 nm per one minute.

(E) Then, the remaining protective film 15 is removed using an organic solvent (acetone). In this stage, the DLC film thickness on the slider air bearing surface is 100 nm fixed in the front half region of the slider but is 5 nm fixed in the rear half region.

(F) After the protective film 15 is removed, the sliders are cut away one after another in accordance with the outer shape dimensions of the slider from the bar member, and magnetic head chips are produced in the following manner.

Each magnetic head chip is attached to a touch lap polishing machine and is worked such that the protective film in the region of the front half of the slider on which the DLC film remains with 100 nm may have a convex shape. Although, in this lapping step, the DLC film at a central portion of the air bearing surface contacts with a polishing tape and is reduced a little in film thickness, since the DLC film at the central portion of the slider does not have an influence on the mechanical durability or the anticorrosion of the magnetic head element at all, the reduction of the film thickness at the central portion is not a problem. The polishing amount of the touch lap polishing is controlled by the speed of rotation of the spherical lapping machine, the pushing load, the lapping time and so forth.

An example of another production method according to the present invention will be described with reference to FIG. 4.

In the present production method, a protective film of a film thickness of approximately 10 nm or less is formed on an air bearing surface of a slider, and the entire surface of the protective film is coated once with a photoresist film, whereafter the photoresist film on the air incoming side of the slider is removed by exposure and development processing. Then, a protective film of a film thickness within the range of approximately 50 to 200 nm is formed in the region, from which the photoresist film has been removed, again, and then, the remaining photoresist is removed using an organic solvent. Then, lapping processing is performed for the entire surface of the protective film to shape the protective film so that it has, on the air incoming side thereof, a convex shape having a maximum film thickness of approximately 50 to 200 nm while the protective film on the air outgoing side on which a magnetic head element is provided has a fixed film thickness of approximately 10 nm or less.

(A) In particular, referring to FIG. 4, a DLC film 15 is first formed as a protective film with a film thickness of 4 nm by the RF-CVD method on sliders 12 in the form of a bar member similar to that described hereinabove with reference to (A) of FIG. 3.

(B) Then, a photoresist film 16 in the form of a sheet with a film thickness of 30 $\mu$m is formed on the DLC protective film 15.

(C) Then, mask exposure and development processing is performed to remove the photoresist film 16 in a front half region of a slider air bearing surface.

(D) Thereafter, another DLC film 15 of a film thickness of 100 nm is formed again by the RF-CVD method.

(E) Then, the remaining photoresist film is removed together with the DLC film formed thereon using an organic solvent (acetone).

(F) Thereafter, the sliders are cut away one after another in accordance with outer shape dimensions of the slide from the bar member to produce magnetic head chips.

In (F) of FIG. 4, each of the magnetic head chips is attached to a tape polishing machine and the front end portion of the slider at which the DLC film remains with 100 nm is polished to work the protective film in the region such that it has a convex shape with a maximum film thickness of 80 nm.

Here, the region of the protective film in which the crown shape is formed is referred to as "crowned region", and embodiment specimens of sliders wherein the type of the protective layer is varied to DLC, DLC and Si, and Si and the length of the crowned region with respect to the length of the slider is varied to ½ and ⅓ are shown in TABLE 1, and comparative specimens produced for comparison wherein the crowned region extends over the full length of the slider and the ratio between them is 1/1 are shown in TABLE 1B.

TABLE 1A

| NO. | FILM | CROWN | CROWN RATIO | CROWN HGT. (nm) | EVEN AREA THICK (nm) |
|---|---|---|---|---|---|
| 1 | DLC | DLC | 1/2 | 80 | 3 = DLC 3 |
| 2 | DLC/Si | Si | 1/2 | 80 | 3 = DLC 2 + Si 1 |
| 3 | DLC/Si | DLC | 1/2 | 80 | 3 = DLC 2 + Si 1 |
| 4 | Poli Si | Poli Si | 1/2 | 80 | 3 = Poli Si 3 |
| 5 | DLC | DLC | 1/3 | 100 | 3 = DLC 3 |
| 6 | DLC/Si | Si | 1/3 | 100 | 3 = DLC 2 + Si 1 |
| 7 | DLC/Si | DLC | 1/3 | 100 | 3 = DLC 2 + Si 1 |
| 8 | Poli Si | Poli Si | 1/3 | 100 | 3 = Poli Si 3 |
| 9 | DLC | | 1/2 | 90 | 5 = DLC 5 |
| 10 | DLC | | 1/2 | 80 | 5 = DLC 5 |
| 11 | DLC | | 1/2 | 70 | 5 = DLC 5 |
| 12 | DLC | | 1/3 | 90 | 5 = DLC 5 |
| 13 | DLC | | 1/3 | 80 | 5 = DLC 5 |
| 14 | DLC | | 1/3 | 70 | 5 = DLC 5 |
| 15 | DLC/Si | | 1/2 | 80 | 4 = DLC 2 + Si 2 |
| 16 | DLC/Si | | 1/2 | 70 | 4 = DLC 2 + Si 2 |
| 17 | DLC/Si | | 1/2 | 60 | 4 = DLC 2 + Si 2 |
| 18 | DLC/Si | | 1/3 | 80 | 4 = DLC 2 + Si 2 |
| 19 | DLC/Si | | 1/3 | 70 | 4 = DLC 2 + Si 2 |
| 20 | DLC/Si | | 1/3 | 60 | 4 = DLC 2 + Si 2 |
| 21 | Poli Si | | 1/2 | 90 | 5 = Poli Si 5 |
| 22 | Poli Si | | 1/2 | 80 | 5 = Poli Si 5 |
| 23 | Poli Si | | 1/2 | 60 | 5 = Poli Si 5 |
| 24 | Poli Si | | 1/3 | 90 | 5 = Poli Si 5 |
| 25 | Poli Si | | 1/3 | 80 | 5 = Poli Si 5 |
| 26 | Poli Si | | 1/3 | 60 | 5 = |Poli Si 5 |
| 27 | DLC | | 1/2 | 80 | 4 = DLC 4 |
| 28 | DLC | | 1/2 | 70 | 4 = DLC 4 |
| 29 | DLC | | 1/2 | 60 | 4 = DLC 4 |
| 30 | DLC | | 1/3 | 80 | 4 = DLC 4 |
| 31 | DLC | | 1/3 | 70 | 4 = DLC 4 |
| 32 | DLC | | 1/3 | 60 | 4 = DLC 4 |

TABLE 1B

| NO. | FILM | CROWN | CROWN RATIO | CROWN HGT. (nm) | EVEN AREA THICK (nm) |
|---|---|---|---|---|---|
| 101 | DLC | DLC | 1/1 | 40 | 10 = DLC 10 |
| 102 | DLC | DLC | 1/1 | 40 | 5 = DLC 5 |
| 103 | DLC/Si | DLC/Si | 1/1 | 40 | 10 = DLC 8 + Si 2 |
| 104 | DLC/Si | DLC/Si | 1/1 | 40 | 5 = DLC 3 + Si 2 |
| 105 | Poli Si | Poli Si | 1/1 | 40 | 10 = Poli Si 10 |
| 106 | Poli Si | Poli Si | 1/1 | 40 | 5 = Poli Si 5 |
| 107 | DLC | DLC | 1/1 | 80 | 10 = DLC 10 |
| 108 | DLC | DLC | 1/1 | 80 | 5 = DLC 5 |
| 109 | DLC/Si | DLC/Si | 1/1 | 80 | 10 = DLC 8 + Si 2 |
| 110 | DLC/Si | DLC/Si | 1/1 | 80 | 5 = DLC 3 + Si 2 |
| 111 | DLC | | 1/1 | 40 | 10 = DLC 10 |
| 112 | DLC | | 1/1 | 40 | 5 = DLC 5 |
| 113 | DLC/Si | | 1/1 | 40 | 10 = DLC 8 + Si 2 |
| 114 | DLC/Si | | 1/1 | 40 | 5 = DLC 3 + Si 2 |
| 115 | Poli Si | | 1/1 | 40 | 10 = Poli Si 10 |
| 116 | Poli Si | | 1/1 | 40 | 5 = Poli Si 5 |
| 117 | DLC | | 1/1 | 80 | 10 = DLC 10 |
| 118 | DLC | | 1/1 | 80 | 5 = DLC 5 |
| 119 | DLC/Si | | 1/1 | 80 | 10 = DLC 8 + Si 2 |
| 120 | DLC/Si | | 1/1 | 80 | 5 = DLC 3 + Si 2 |

In TABLE 1A, it is indicated that the embodiment specimen 1 is a magnetic head slider wherein the type of the protective film is DLC, the crowned protective film is DLC, the crowned region is ½ the length of the slide, the height of the crown is 80 nm, and the film thickness in a region in which the film thickness is fixed is 3 nm.

The magnetic head slider of the embodiment specimen 2 has a quite similar construction to that of the embodiment specimen 1 except that the protective film has a two-layer structure. This protective film is a DLC/Si layered film wherein Si produced by a high frequency sputtering method is formed as a ground layer and a DLC film formed by the RF-CVD method is provided on the Si ground layer. The film thickness of the Si ground film was varied by opening the shutter of the jig upon formation of the Si ground film. The conditions of the Si film formation were such that the RF output was 400 W, and the Ar pressure upon film formation was 50 mTorr. The thickness of the Si film was 80 nm in the crowned region, but was 1 nm in the fixed film thickness region, and the DLC film of a fixed thickness of 2 rum was formed on the Si film so that the total thickness would be 3 nm.

The magnetic head slider of the embodiment specimen 3 is a modification to the embodiment specimen 2 wherein the DLC film and the Si film are exchanged for each other and the thickness of the Si film is a fixed value of 1 nm while the thickness of the DLC film varies such that it is 80 nm in the crowned region but is 2 nm in the fixed film thickness region.

The magnetic head slider of the embodiment specimen 4 was constructed such that a protective film of a single layer of polycrystalline Si was formed under the conditions that the RF output was 400 W, the gas upon film formation was Ar +20% $H_2$, and the pressure was 1 Pa and then excimer laser was irradiated upon the Si film to convert the Si film into a polycrystalline film.

The magnetic head sliders of the embodiment specimens 5 to 8 were constructed such that the crowned regions and the crown heights of the magnetic head sliders of the embodiment specimens 1 to 4 described above were changed to ⅓ and 100 nm, respectively. FIG. 2 shows a sectional view taken along the air bearing surface of the embodiment specimen 5 as an example.

Meanwhile, the embodiment specimens 9 to 32 were constructed varying the combination of the material of the protective film of the magnetic head slider, the rate of the crowned region, the crown height and the film thickness in the flat portion.

In particular, for example, the embodiment specimens 9 to 14 all include a DLC protective film and were shaped by touch lap polishing such that the crowned region was ½ in the embodiment specimens 9 to 11 but ⅓ in the embodiment specimens 12 to 14 and the maximum film thickness of the DLC film at the front end portion of the slider was 90 nm in the embodiment specimens 9 and 12, 80 nm in the embodiment specimens 10 and 13 and 70 nm in the embodiment specimens 11 and 14.

The embodiment specimens 15 to 20 are quite similar to those of the embodiment specimens 9 to 14 except that the protective film is formed from two layers of DLC and Si and the film thickness thereof is changed a little. The protective films of them were formed such that Si produced by the high frequency sputtering method was used as a ground film and a DLC film produced by the RF-CVD method under the same conditions as those of the embodiment specimens 9 to 14 was formed with 100 nm on the Si ground layer. Then, the DLC film of the rear half portion of the slider was exposed by photoresist coating, exposure and development processing and the film thickness of the DLC was reduced by a plasma pushing method. The etching rate of the DLC film by the plasma pushing method was 3 nm per one minute. The protective film construction at the rear half portion of the slider was 2 nm for Si and 2 nm for DLC.

The embodiment specimens 21 to 26 are sliders wherein the protective film is a single layer of polycrystalline Si and are similar to the other specimens in that the crowned region is ½ or ⅓, the crown height is 90 to 60 nm, and the film thickness of the flat portion is 5 nm.

The sliders of the embodiment specimens 27 to 32 have protective films of DLC produced by the second production method, and the crowned region is ½ or ⅓, the crown height is 80 to 60 nm, and the film thickness of the flat portion is 4 nm.

Meanwhile, the comparative specimens 101 to 120 indicated in TABLE 1B were produced for comparison of effects of the present invention with those of conventional magnetic head sliders produced by mechanical working. The comparative specimens 101 to 106 were produced such that a protective film of a DLC single layer, a polycrystalline Si single layer or a two-layer structure of Si/DLC was formed under formation conditions similar to those of the specimens described hereinabove on a slider air bearing surface on which a crown of 35 to 45 nm, 40 nm in average, was formed by mechanical working.

Figure 5:
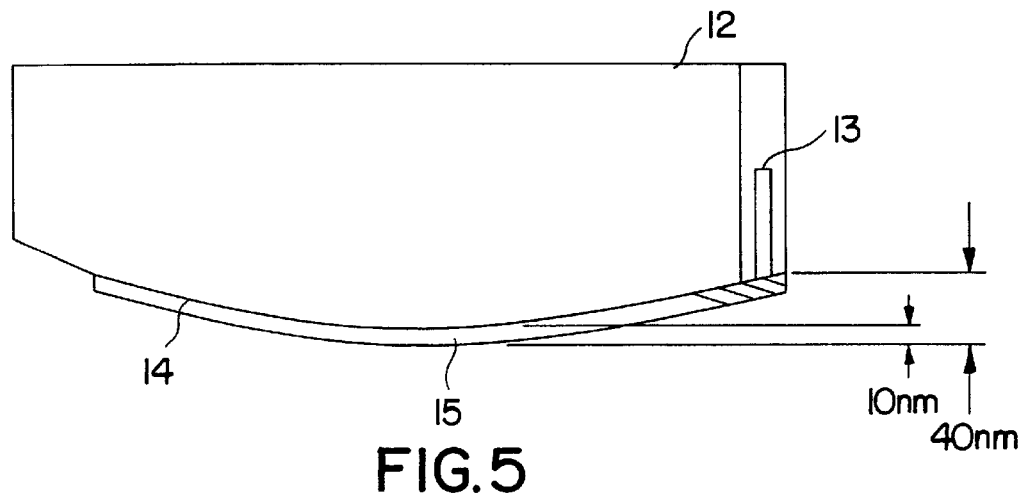
FIG. 5 is a sectional view taken along an air bearing surface of an example of a magnetic head slider of a comparative specimen.

For example, the comparative specimen 101 is constructed such that the type of the protective film is DLC and consequently also the crowned protective film is DLC, the entire surface of the air bearing surface is a crowned region and the ratio thereof is 1/1, the crown height is 40 nm, and the film thickness of the fixed film thickness portion is 10 nm. FIG. 5 is a sectional view taken along the air bearing surface of the comparative specimen.

Meanwhile, the comparative specimens 107 to 110 are magnetic head sliders wherein a DLC protective film is formed on the entire area of the air bearing surface finished flat to a tolerance of +/−2 nm such that the crown height may be 80 nm. A measurement of the film thickness distribution revealed that the DLC film thickness in the magnetic element region was 10 nm. It is to be noted that the film thickness of the "fixed film thickness portion" indicates the thickness of the protective film in a region in which a magnetic head element which determines the magnetic spacing is provided.

Figure 6:
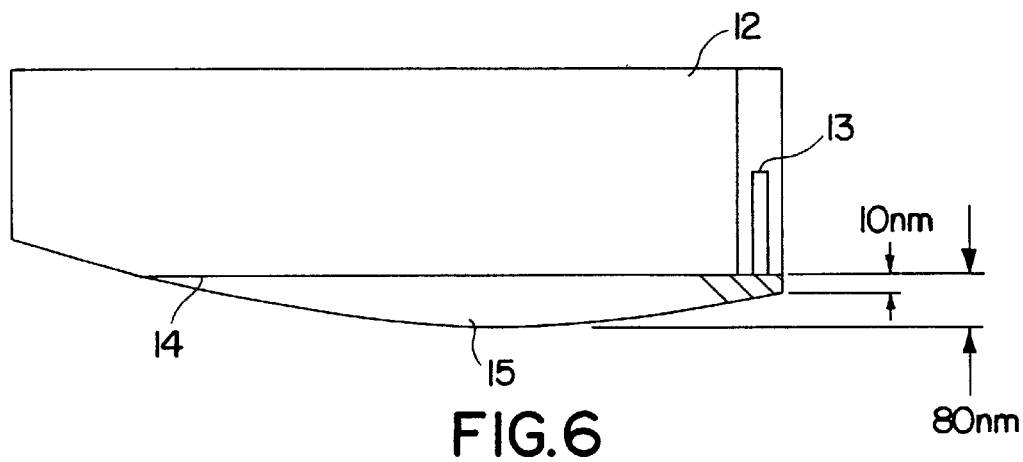
FIG. 6 is a sectional view taken along an air bearing surface of another example of a magnetic head slider of a comparative specimen.

For example, the comparative specimen 107 is constructed such that the type of the protective film is DLC in the crowned portion, the ratio of the crowned region is 1/1, the crown height is 80 nm, and the protective film thickness of the magnetic head element portion is 10 nm. FIG. 6 is a sectional view taken along the air bearing surface of the comparative specimen.

Individual magnetic head sliders were cut away from the bar members to which such working as described above had been performed and were secured by adhesion to suspensions for a magnetic head slider having a preset load of 2.8 g. Then, the following durability test was performed for each of the magnetic head sliders.

First, a contact start stop (hereinafter referred to simply as CSS) test was performed to measure the CSS time number at which the coefficient of dynamic friction began to increase. The magnetic disk used for the test was a magnetic disk medium for which an Al alloy substrate was used. The film construction of the magnetic disk was a lubricating film (film thickness: 2 nm), a sputtered carbon protective film (20 nm), a CoNiTa magnetic film (35 nm), a Cr ground film (90 nm) and the Al alloy substrate, and the average roughness of the magnetic disk surface was approximately 5 nm.

Figure 7:
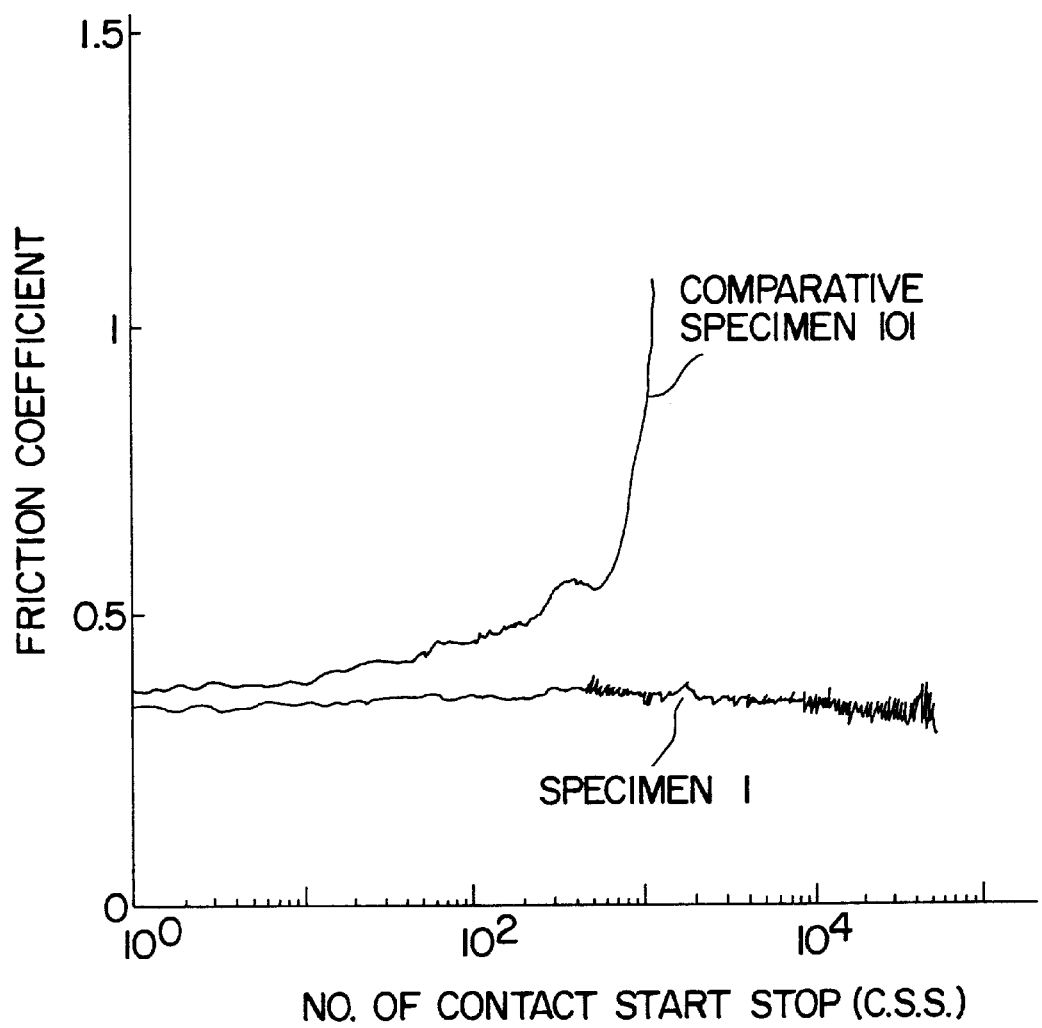
FIG. 7 is a diagram showing variations of the coefficient of friction with respect to the CSS time number measured for an embodiment specimen 1 and a comparative specimen 101.

FIG. 7 is a diagram showing relationships between the CSS time number and the coefficient of friction measured with the embodiment specimen 1 according to the present invention and the corresponding comparative specimen 101. While the embodiment specimen 1 exhibits a coefficient of friction stable approximately at 0.3 to 0.4 even where the CSS time number is 50,000, the comparative specimen 101 exhibits a coefficient of friction which increases suddenly around the CSS time number of 1,000.

This arises from leveling of the surface by abrasion of the carbon protective film of the magnetic disk medium, and since the rate of the abrasion of the carbon protective film on the medium surface, that is, the rate of progress of the surface leveling, is restrained by the protective film on the air bearing surface of the slider, the CSS time number at which the coefficient of friction increases suddenly reflects the effectiveness of the protective film of the magnetic head slider.

Figure 8:
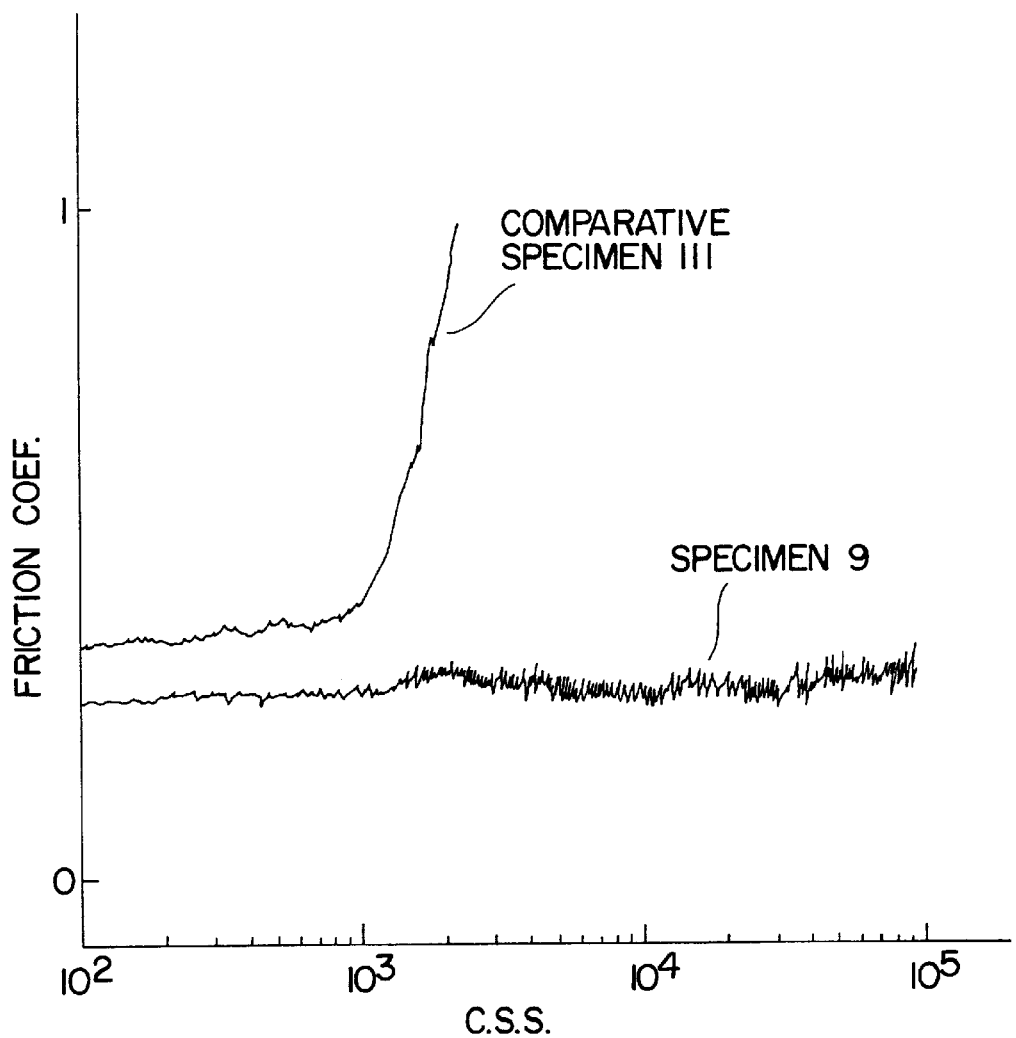
FIG. 8 is a diagram showing variations of the coefficient of friction with respect to the CSS time number measured for another embodiment specimen 9 and another comparative specimen 111.

FIG. 8 shows a result of similar comparison and measurement conducted for the embodiment specimen 9 and the comparative specimen 111.

While, in the embodiment specimen 9, the coefficient of friction is stable approximately at 0.3 to 0.4 until the CSS reaches 100,000 times, the comparative specimen 111 exhibits a sudden increase of the coefficient of friction when the CSS is 1,000 times. The increase of the coefficient of friction arises from surface leveling by abrasion of the carbon protective film of the magnetic disk medium. Since the rate of the abrasion of the carbon protective film of the medium surface, that is, the rate of progress of the surface leveling, is restrained by the protective film on the air bearing surface of the slider, the CSS time number at which the coefficient of friction increases suddenly reflects that the protective film of the magnetic head slider is effective.

TABLE 2A and TABLE 2B indicate CSS endurance time numbers and coefficients of friction of the embodiment specimens 1 to 32 and the comparative specimens 101 to 120 measured in a similar manner with the specimens.

TABLE 2A

| NO. | NO. OF CSS | 12 HRS STICKING |
|---|---|---|
| 1 | >50,000 | 0.55 |
| 2 | >50,000 | 0.50 |
| 3 | >50,000 | 0.42 |
| 4 | >50,000 | 0.41 |
| 5 | >50,000 | 0.42 |
| 6 | >50,000 | 0.55 |
| 7 | 40,000 | 0.54 |
| 8 | >50,000 | 0.43 |
| 9 | >100,000 | 0.55 |
| 10 | >100,000 | 0.35 |
| 11 | 80,000 | 0.52 |
| 12 | 70,000 | 0.48 |
| 13 | >100,000 | 0.37 |
| 14 | 50,000 | 0.38 |
| 15 | 80,000 | 0.45 |
| 16 | >100,000 | 0.43 |
| 17 | 50,000 | 0.54 |
| 18 | >100,000 | 0.32 |
| 19 | >100,000 | 0.60 |
| 20 | 70,000 | 0.51 |
| 21 | 50,000 | 0.53 |
| 22 | 90,000 | 0.55 |
| 23 | >100,000 | 0.36 |
| 24 | 50,000 | 0.42 |
| 25 | 60,000 | 0.43 |
| 26 | 50,000 | 0.64 |
| 27 | 70,000 | 0.61 |
| 28 | 80,000 | 0.33 |
| 29 | >100,000 | 0.32 |
| 31 | >100,000 | 0.28 |
| 32 | >100,000 | 0.42 |

TABLE 2B

| NO. | NO. OF CSS | 12 HRS STICKING |
|---|---|---|
| 101 | 1,000 | 0.90 |
| 102 | 500 | 0.85 |
| 103 | 5,000 | 0.78 |
| 104 | 1,000 | 0.75 |
| 105 | 5,000 | 0.71 |
| 106 | 500 | 0.77 |
| 107 | 40,000 | 0.65 |
| 108 | 30,000 | 0.68 |
| 109 | 40,000 | 0.65 |
| 110 | 20,000 | 0.62 |
| 111 | 1,000 | 0.90 |
| 112 | 500 | 0.85 |
| 113 | 5,000 | 0.78 |
| 114 | 1,000 | 0.75 |
| 115 | 5,000 | 0.71 |
| 116 | 500 | 0.77 |
| 117 | 40,000 | 0.65 |
| 118 | 30,000 | 0.68 |
| 119 | 40,000 | 0.65 |
| 120 | 20,000 | 0.62 |

As apparently seen from TABLE 2A and TABLE 2B, while the CSS endurance time numbers of the magnetic head sliders of the embodiment specimens 1 to 32 according to the present invention are higher than 40,000, the CSS endurance time numbers of the comparative specimens 101 to 106 wherein a crown was formed by a mechanical polishing method and a protective film of a fixed film thickness was formed on the crown in a conventional manner were 5,000 at most. Thus, the effect of the trade-off of the magnetic spacing and the CSS durability according to the present invention is evident.

With the comparative specimens 107 to 110 and 117 to 120 wherein a protective film of a crown shape is provided over the entire area of a slider surface, the CSS time number ranges from 20,000 to 40,000 and they exhibit better durabilities than the comparative specimens 101 to 106. However, it can be seen that the embodiment specimens 1 to 8 according to the present invention are rather superior.

Further, as a test for quantitatively grasping a degree of sticking between a magnetic head slider and a magnetic disk medium, a coefficient of statical friction was measured when rotation of the magnetic disk medium was started after rotation of the magnetic disk medium had been stopped for 12 hours in a condition wherein the magnetic head slider was pressed against the magnetic disk medium. The coefficient of statical friction is referred to as 12-hour sticking, and an average value of 20 values of the 12-hour sticking measured with each specimen is indicated in TABLE 2A and TABLE 2B together with the CSS time number.

While the 12-hour sticking average values of the embodiment specimens 1 to 8 according to the present invention are 0.41 to 0.55, those of the comparative specimens 101 to 106 based on a mechanical polishing method are 0.71 to 0.90 and even those of the comparative specimens 107 to 120 wherein a crown is formed on a protective film over the entire area of a slider are 0.62 to 0.65. Accordingly, the effect in reduction of sticking by the present invention is apparent.

Further, while the comparative specimens 107 to 110 and 117 to 120 have a crown height set to 80 nm for comparison with the embodiment specimens, if a crown of this height is provided on the slider surface of each of the comparative specimens 107 to 110 and 117 to 120, then the region of the magnetic head element portion does not assume the position of the minimum flying height of 35 nm, but the flying height of the magnetic head element portion exhibits a value higher by 5 to 6 nm than 35 nm. Accordingly, the magnetic spacing length increases by 5 to 6 nm. Therefore, in order that the magnetic head element portion of each of the comparative specimens 107 to 110 may be the minimum flying height, the crown height must be lower than 50 nm. Then, if the crown height is smaller than 50 nm, then the values of the 12-hour shelf sticking increase from those of TABLE 2A and TABLE 2B and are substantially equal to those of the comparative specimens 101 to 106. Thus, it is proved that a magnetic head slider wherein a crown is formed on a protective film over an entire area of a slider exhibits little effect on reduction in stick.

It is to be understood that variations and modifications of the magnetic head slider disclosed herein will be evident to those skilled in the art. It is intended that all such modifications and variations be included within the scope of the appended claims.

What is claimed is:

1. A production method for a magnetic head slider of the air flying type wherein a magnetic head element is provided in the proximity of an end portion on the air outgoing side and a protective film is provided on an air bearing surface, comprising the steps of:
   (a) forming a protective film with approximately 50 to 200 nm on an air bearing surface of a magnetic head slider;
   (b) coating an entire surface of the protective film formed by the preceding step with a photoresist film;
   (c) removing the photoresist film on an air outgoing side by exposure and development processing;
   (d) performing etching processing for the protective film in a region from which the photoresist film has been removed in the preceding step to reduce the film thickness to approximately 10 nm or less;

(e) removing the photoresist film remaining after the etching processing; and (f) performing lapping processing for the entire surface of the protective film.

2. A production method for a magnetic head slider of the flying type wherein a magnetic head element is provided in the proximity of an end portion on the air outgoing side and a protective film is provided on an air bearing surface, comprising the steps of:

(a) forming a protective film with approximately 10 nm or less on an air bearing surface of a magnetic head slider;

(b) coating an entire surface of the protective film formed by the preceding step with a photoresist film;

(c) removing the photoresist film on an air outgoing side by exposure and development processing;

(d) forming a protective film in a region of the protective film from which the photoresist film has been removed in the preceding step until the film thickness of the protective film becomes substantially equal to 50 to 200 nm;

(e) removing the photoresist film remaining after the re-formation processing of the protective film; and (f) performing lapping processing for the entire surface of the protective film.

3. A method as claimed in claim 1, wherein said protective film is formed of a diamond-like carbon film (DLC).

4. A method as claimed in claim 1, wherein said protective film is formed of polycrystalline Si.

5. A method as claimed in claim 1, wherein said protective film is formed as a layered film.

6. A method as claimed in claim 5, wherein said protective film is formed of films of Si and DLC layered on each other.

7. A method as claimed in claim 2, wherein said protective film is formed of a diamond-like carbon film (DLC).

8. A method as claimed in claim 2, wherein said protective film is formed of polycrystalline Si.

9. A method as claimed in claim 2, wherein said protective film is formed as a layered film.

10. A method as claimed in claim 9, wherein said protective film is formed of films of Si and DLC layered on each other.

* * * * *